(12) United States Patent
Fong et al.

(10) Patent No.: US 7,671,278 B2
(45) Date of Patent: Mar. 2, 2010

(54) CABLE HAVING EMI-SUPPRESSING ARRANGEMENT AND METHOD FOR MAKING THE SAME

(75) Inventors: Jen-Guo Fong, Tu-Cheng (TW); Hsi-Fu Lee, Tu-Cheng (TW); Kuan-Fu Chen, Tu-Cheng (TW)

(73) Assignee: Hon Hai Precision Ind. Co., Ltd, Taipei Hsien (TW)

( * ) Notice: Subject to any disclaimer, the term of this patent is extended or adjusted under 35 U.S.C. 154(b) by 0 days.

(21) Appl. No.: 11/981,287

(22) Filed: Oct. 31, 2007

(65) Prior Publication Data

US 2008/0099239 A1    May 1, 2008

(30) Foreign Application Priority Data

Oct. 31, 2006    (CN) .................. 2006 1 0097192

(51) Int. Cl.
*H01B 7/18*    (2006.01)
(52) U.S. Cl. ................................. 174/106 R

(58) Field of Classification Search ............. 174/106 R, 174/36; 333/12

See application file for complete search history.

(56) References Cited

U.S. PATENT DOCUMENTS

| 4,371,742 A | 2/1983 | Manly |
| 4,383,225 A * | 5/1983 | Mayer ................ 333/12 |
| 2004/0055772 A1 | 3/2004 | Tsutsui |

FOREIGN PATENT DOCUMENTS

| JP | 09-306245 | * 11/1997 |
| JP | A-6-203652 | 7/2004 |

* cited by examiner

*Primary Examiner*—Chau N Nguyen
(74) *Attorney, Agent, or Firm*—Wei Te Chung; Andrew C. Cheng; Ming Chieh Chang

(57) ABSTRACT

Provided herewith a cable (1, 2) with EMI suppressing arrangement which comprises a conductive wire (10) and an insulative layer (20) enveloping over the wire. A braided metal layer (30) envelops over the insulative layer, and a magnetic layer (40, 501) is arranged thereover. And an insulative jacket (50, 502) envelops over the magnetic layer.

3 Claims, 2 Drawing Sheets

CABLE HAVING EMI-SUPPRESSING ARRANGEMENT AND METHOD FOR MAKING THE SAME

BACKGROUND OF THE INVENTION

1. Field of the Invention

The present invention relates to a cable, and more particularly to a cable having EMI Suppressing Arrangement of a magnetic layer arranged to an outer surface of a shielding layer of the cable. The invention also relates to a method for making the same.

2. Description of the Prior Art

It is already known to provide a ferrite core on an outer surface of a cable assembly intermediate opposite ends thereof in order to suppress the electromagnetic-wave interference (EMI) during transmission of signal, especially at high speed transmission. Generally, the ferrite core is arranged on that portion of the cable assembly near to a connector terminated thereto. This portion of the cable assembly is covered from the exterior. In this configuration, EMI noises are prevented from intruding into the cable from the exterior, and also EMI noises are prevented from negatively effecting to a signal transmitted through a wire conductor therein.

However, an assembling operational process for securely attaching the ferrite core to the cable assembly is cumbersome, and also there are restrictions with respect to an increased mounting space, an increased weight, etc. As a result, the cost of the cable assembly increases. In addition, there is a fear that the ferrite core is damaged since it projects much from the cable.

In order to overcome these difficulties, a proposed solution has been provided that a second insulating layer of the cable assembly is provided on an outer surface of a shielding layer, and then an amorphous magnetic layer is provided on an outer surface of the second insulating layer at least over a given area thereof. In this cable assembly, a first insulating layer is provided on an outer surface of a conductor, and the shielding layer which is in the form of a braided metal wire is formed on an outer peripheral surface of the first insulating layer. The second insulating layer is formed on the outer surface of the shielding layer, and the amorphous magnetic layer is formed on the outer surface of the second insulating layer over an entire length thereof or over at least part of the length thereof. Typically disclosed in JP-A-6-203652, Pages 1 to 4, FIGS. 1 and 2.

The cable assembly, disclosed in the above patent publication, is more advantageous in view of the restrictions on the mounting space, the weight, etc., as compared with the cable having the ferrite core provided thereon. However, its effect of suppressing EMI noises has been low since a base tape of an amorphous magnetic tape, forming the amorphous magnetic layer, is made of polyester or PPS.

Hence, an improved EMI-suppressing cable is desired to overcome the above problems.

BRIEF SUMMARY OF THE INVENTION

It is therefore an object of the present invention to provide a cable having EMI Suppressing Arrangement having the magnetic layer formed on the outer surface of the shielding layer, which enable to enhance the EMI-suppressing effect and also to reduce the cost.

It is another object of the present invention to provide a manufacturing method of a cable having EMI Suppressing Arrangement having the magnetic layer formed on the outer surface of the shielding layer, which enable to enhance the EMI-suppressing effect and also to reduce the cost.

In order to achieve the object set forth, a cable with EMI suppressing arrangement in accordance with the present invention comprises a conductive wire and an insulative layer which envelops over the wire. A braided metal layer envelops over the insulative layer, and a magnetic layer is arranged thereover. And an insulative jacket envelops over the magnetic layer.

In order to achieve the object set forth, a method for making a cable with EMI suppressive arrangement comprises the steps of 1) providing a conductive wire; 2) providing a layer of insulative material over the conductive wire; 3) providing a layer of shielding material over the insulative material; 4) providing a layer of magnetic material over the shielding material; and 5) providing an insulative jacket over the layer of magnetic material.

In the above configuration, as compared with the related construction in which the ferrite core is externally provided on a localized portion of the outer surface of the cable, the externally-mounting operation is not necessary, which contributes to the reduction of the cost. And besides, there are no restriction with respect to the increased mounting space, the increased weight, etc., and therefore this cable is highly useful.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Reference will now be made in detail to the preferred embodiment of the present invention.

Figure 1:
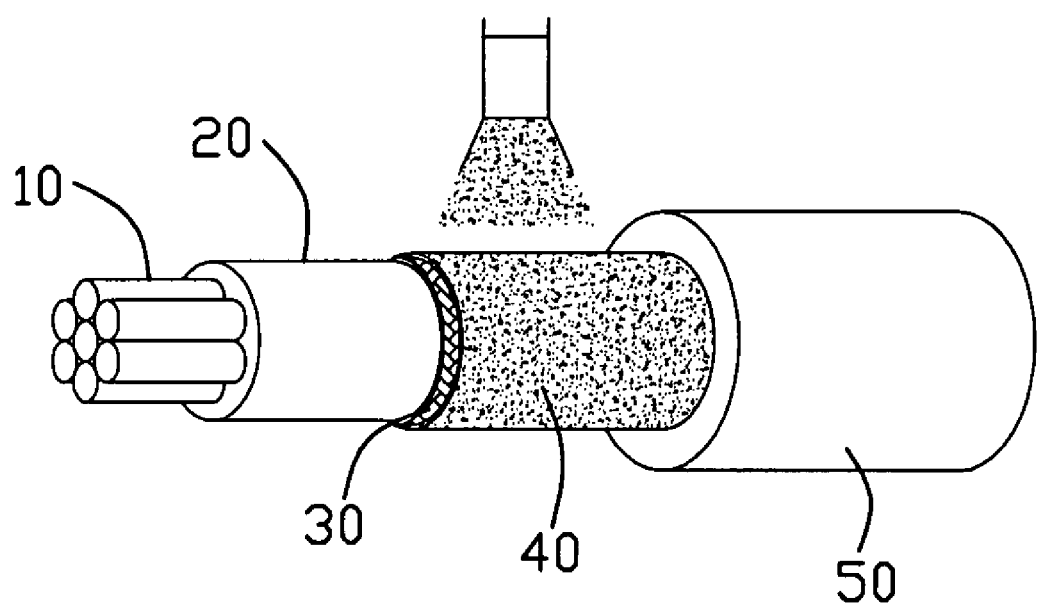
FIG. 1 is a partly-broken, perspective view of a cable having EMI Suppressing Arrangement according to a first embodiment of the invention.

Please referring to FIG. 1, a cable 1 having EMI Suppressing Arrangement according to the current invention comprises a conductive wire 10 which has a plurality of conductors twisted together, an insulative layer 20 enclosing the wire 10, a metal shielding layer 30 enclosing the insulation layer 20, a magnetic layer 40 enclosing the metal shielding layer 30, and an insulative jacket enclosing the magnetic layer 40.

The plurality of conductors arrange on a ring and electrically contact each other, and are made of metal (such as copper, silver, copper-plated steel and silver-plated steel) having excellent conductivity, high mechanical durability and excellent corrosion resistance.

The insulative layer 20 is extruded over the wire 10 through a die so that the short-circuiting between the wire 10 and the metal shielding layer 30 will not occur. In the illustrated embodiment, the material of the first insulating layer 20 may be Teflon or PE (Polyethylene).

In the illustrated embodiment, the metal shielding layer 30 is a braided metal layer made of copper or tin-plated copper by a Knitting Machine. However, the metal shielding layer 30 is not limited to this type, but can be also a metal foil or metal band. The braided metal layer is to protect the signal transmission of the wire 10 from external electromagnetic interference, but also to prevent the wire 10 from radiating to the exterior. The shielding effect of the braided metal layer is related to the close degree how the braided metal layer is woven: the more closely the braided metal layer is woven, the better the shielding effect of the braided metal layer is, as a mass of seams of the braided metal layer affect the shielding effect.

By spraying magnetic materials (such as magnetic ferrites) on the outer surface of the braided metal layer, the magnetic layer 40 is manufactured. The seams of the braided metal layer is filled with the magnetic materials, and magnetic materials have high permeability and good frequency characteristic, so the EMI-suppressing cable 1 has better anti-EMI performance.

The insulative jacket 50 is extruded over the outer surface of the magnetic layer 40 through a die, so there is no fear that the magnetic layer 40 is damaged. The insulative jacket 50 is made of PVC (Polyvinyl chloride).

Figure 2:
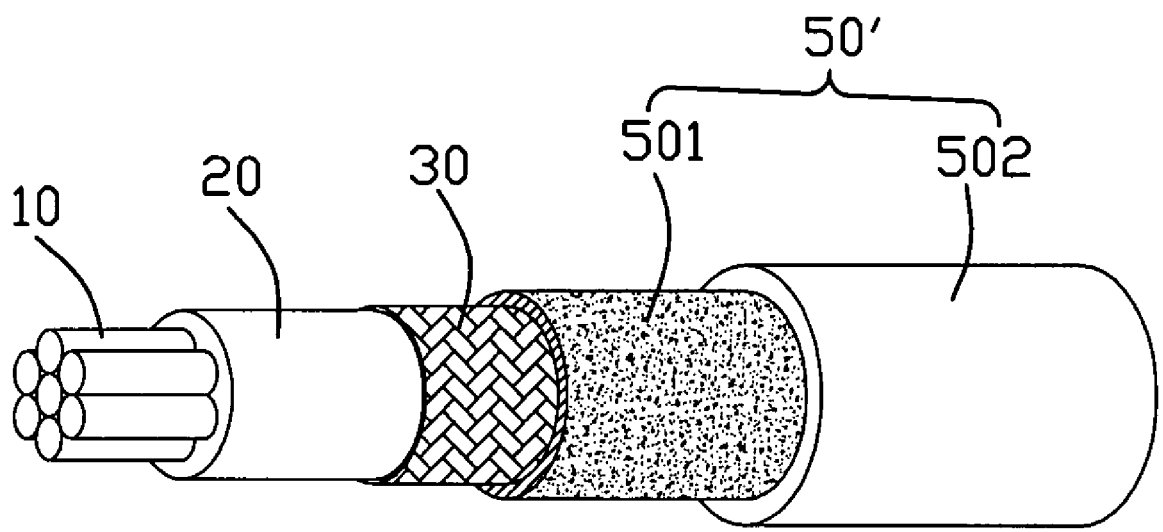
FIG. 2 is a partly-broken, perspective view of a cable having EMI Suppressing Arrangement according to a second embodiment of the invention.

FIG. 2 shows a cable having EMI Suppressing Arrangement 2 according to a second embodiment of the current invention. The EMI-suppressing cable 2 comprises a conductive wire 10, an insulative layer 20 enclosing the wire 10, a braided metal layer 30 enclosing the insulation layer 20, and an outermost layer 50' enclosing the metal shielding layer 30.

The outermost layer 50' comprises a magnetic layer 501 adjacent to the braided metal layer 30 and the insulative jacket 502 at the outermost thereof to protect the magnetic layer 501. The insulative jacket 502 is made of PVC (Polyvinyl chloride). In the illustrated embodiment, the entire outermost layer 50' is extruded through a die during a single working procedure. However, the outermost layer 50' is not limited to this manufacture method, but can include a two-step manufacture method: in the first step, the magnetic layer 501 is extruded over the outer surface of the braided metal layer 30 through a die, and in the second step, the insulative jacket 502 extruded at the outermost thereof through a die.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A cable having EMI-suppressing arrangement, comprising:
   a conductive wire;
   an insulative layer enclosing the wire;
   an insulative jacket surrounding the insulative layer; and
   material located directly and intimately sandwiched between said insulative layer and said insulative jacket including braiding and magnetic materials; wherein
   said braiding material is in a form of layer, said magnetic material is mixed up within said braiding material, said magnetic material is in a form of layer intimately contacting the braiding material; wherein
   said magnetic material surrounds said braiding material.

2. The cable as claimed in claim 1, wherein said magnetic material is magnetic ferrite.

3. The cable as claimed in claim 1, wherein said magnetic material is sprayed around the braiding material.

* * * * *